United States Patent [19]

McGann

[11] Patent Number: 5,375,541
[45] Date of Patent: Dec. 27, 1994

[54] MATERIAL INSERTION MACHINE

[76] Inventor: Laurence McGann, 4780 Excelente Dr., Woodland Hills, Calif. 91364

[21] Appl. No.: 849,737

[22] Filed: Mar. 12, 1992

[51] Int. Cl.⁵ .............................................. A01C 15/00
[52] U.S. Cl. ...................................... 111/162; 111/173; 111/150; 172/76
[58] Field of Search ...................... 111/89, 93, 99, 162, 111/123, 36, 150, 156, 157, 158, 170, 173, 186, 926, 62, 55, 59; 172/105, 76, 106, 694, 459, 488, 476

[56] References Cited

U.S. PATENT DOCUMENTS

| | | | |
|---|---|---|---|
| 1,541,955 | 6/1925 | Hollenbeck | 172/459 |
| 2,596,898 | 5/1952 | Hoppes | 111/173 |
| 2,713,442 | 7/1955 | McFarling et al. | 111/173 |
| 2,748,986 | 6/1956 | Steel | 111/170 |
| 2,767,631 | 10/1956 | Mowbray | 172/106 |
| 3,055,530 | 9/1962 | Mundhenke | 172/105 |
| 3,128,921 | 4/1964 | Henderson | 111/173 |
| 4,152,993 | 5/1979 | van der Lely et al. | 111/162 |

FOREIGN PATENT DOCUMENTS

| | | |
|---|---|---|
| 153181 | 9/1953 | Australia . |
| 285833 | 2/1935 | Italy . |
| 388683 | 6/1965 | Switzerland . |

*Primary Examiner*—David H. Corbin
*Assistant Examiner*—Spencer Warnick

[57] ABSTRACT

A machine for slitting turf or soil and inserting particulate solids in the bottom of the cut slits. This machine consists of a propulsion unit, cutter blades, a material hopper, a material flow control valve, a set of rotary material supply vanes driven by a measurement wheel in contact with the ground, a set of insertion tubes mounted on a gimbal assembly which allows the insertion tubes to free float independent of machine tip and tilt motion. The insertion tubes therefore follow the bottom of the cut slits, dispensing the solid material therein. Also disclosed is a novel insertion tube.

12 Claims, 19 Drawing Sheets

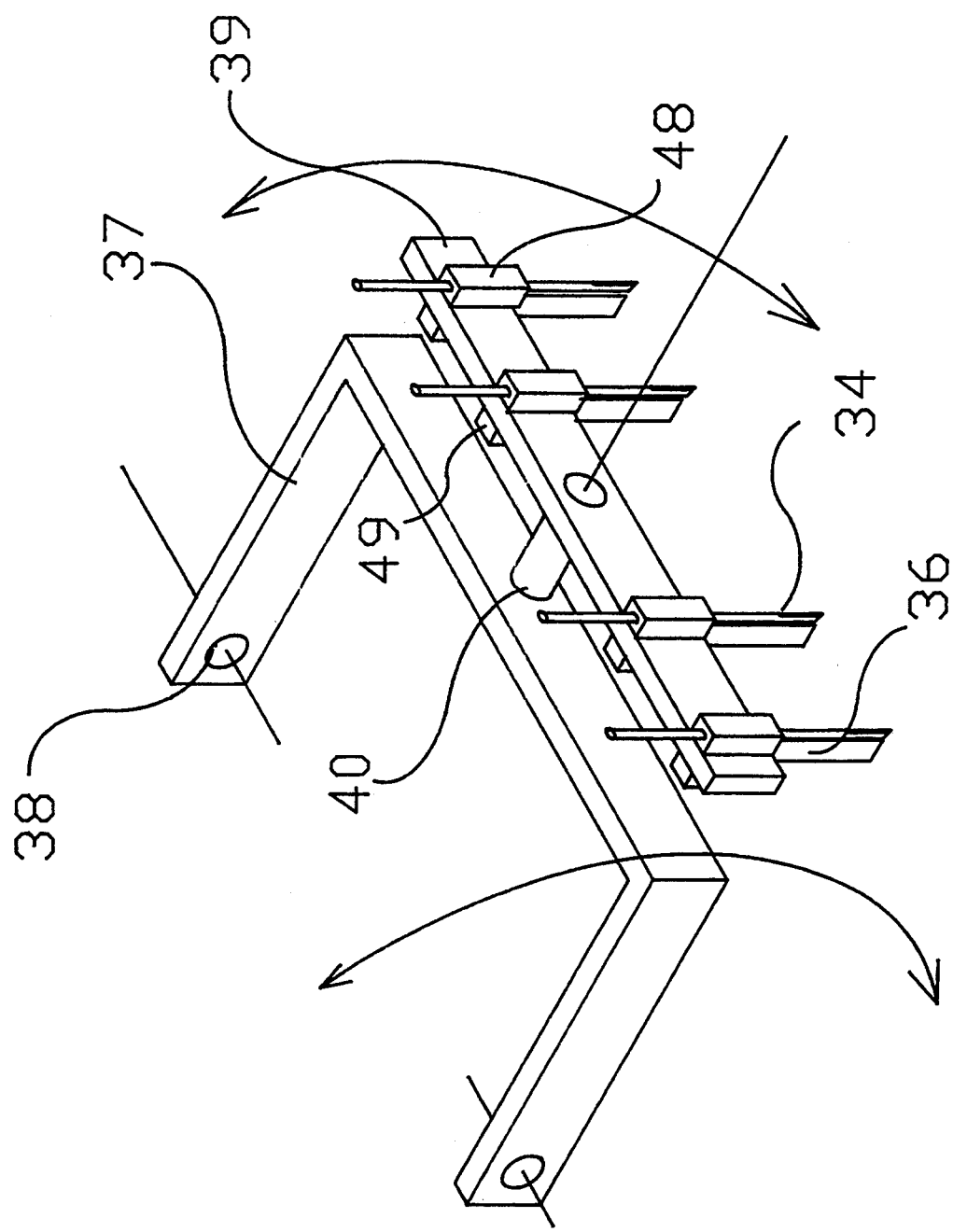

MATERIAL INSERTION MACHINE

This invention relates to a machine for insertion of a particulate solid material, for example, water retaining polymer, fertilizer, seed, lime or other material, into soil or turf. In one of its more specific aspects, it relates to a self-propelled machine for slitting existing turf, thereby aerating it, and inserting the particulate material into the open slits. In another of its more specific aspects, this invention relates to a structure suitable as an accessory for a tractor, self-propelled tiller or the like, for aerating and inserting particulate solid into turf or soil. Other features of this invention include improved insertion tube structure, which reduces clogging by loose soil when introducing the material below the surface of the soil and a gimbal assembly for a plurality of such insertion tubes whereby the insertion tubes are free floating so as to follow the bottom of the cut slits in rough terrain.

A preferred embodiment of the invention comprises a compact hand operated self-propelled machine, often referred to as a "Walk-behind". This type of machine can be used in small spaces and is quite flexible in its operation. It allows the operator to work into corners and to back up to a wall, close to the side of a building or fence. The machine can be raised at any time to clear sprinkler heads, small plants, and the like. It is easy for the operator to see just where the cutters are going so that unwanted damage can be avoided. At the end of a run, the machine can be turned around in its own length for a parallel run in the opposite direction.

The nature of this invention will be better understood from the following detailed description of a preferred embodiment of the invention and with reference to the accompanying drawings, as follows:

DESCRIPTION OF THE DRAWINGS

FIG. 5: Isometric view of the Insertion Tube Gimbal Assembly.

DESCRIPTION OF

Figure 1:
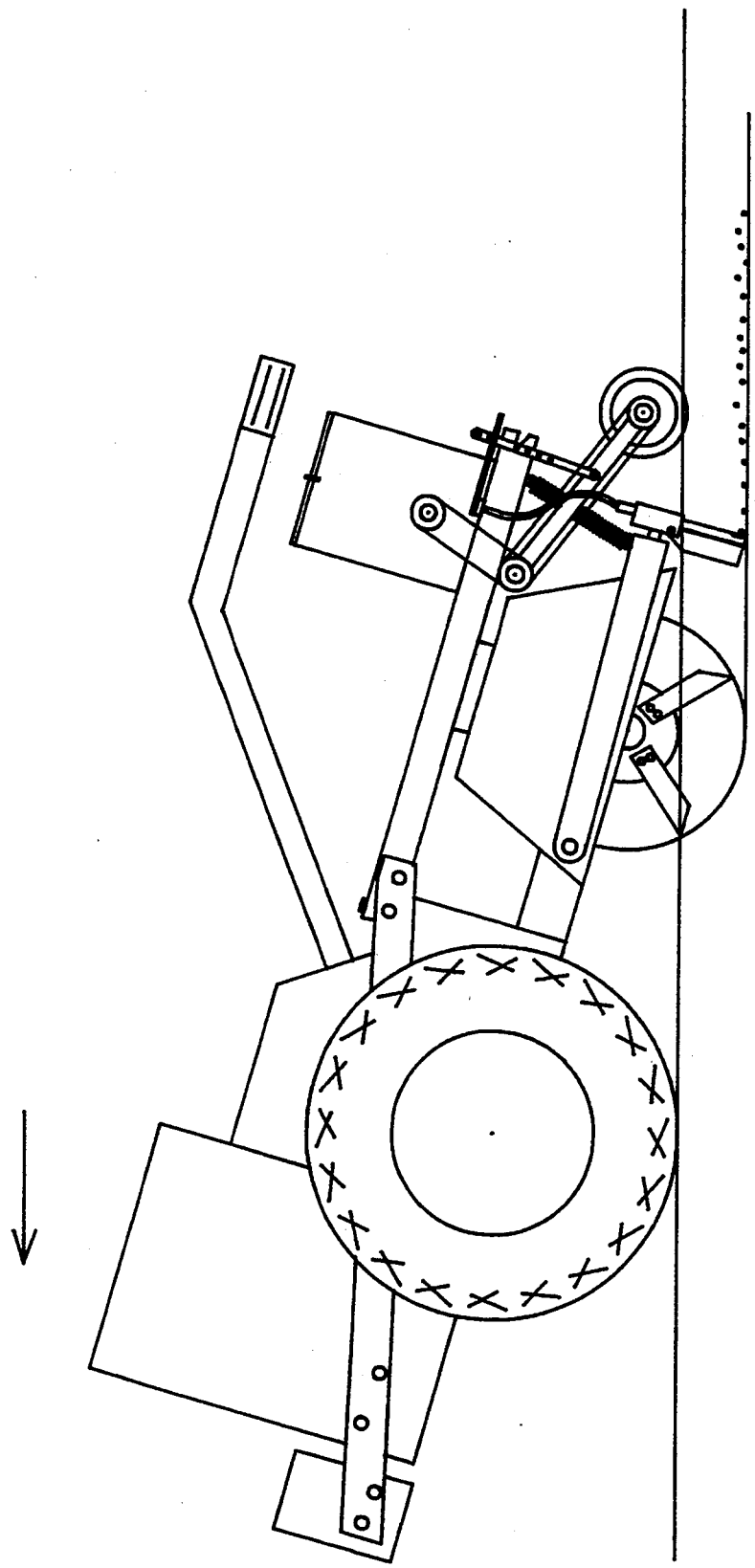
FIG. 1: Side elevational view of a preferred embodiment.

FIG. 1 shows a side view of the entire invention without component numbers for clarity.

Figure 2:
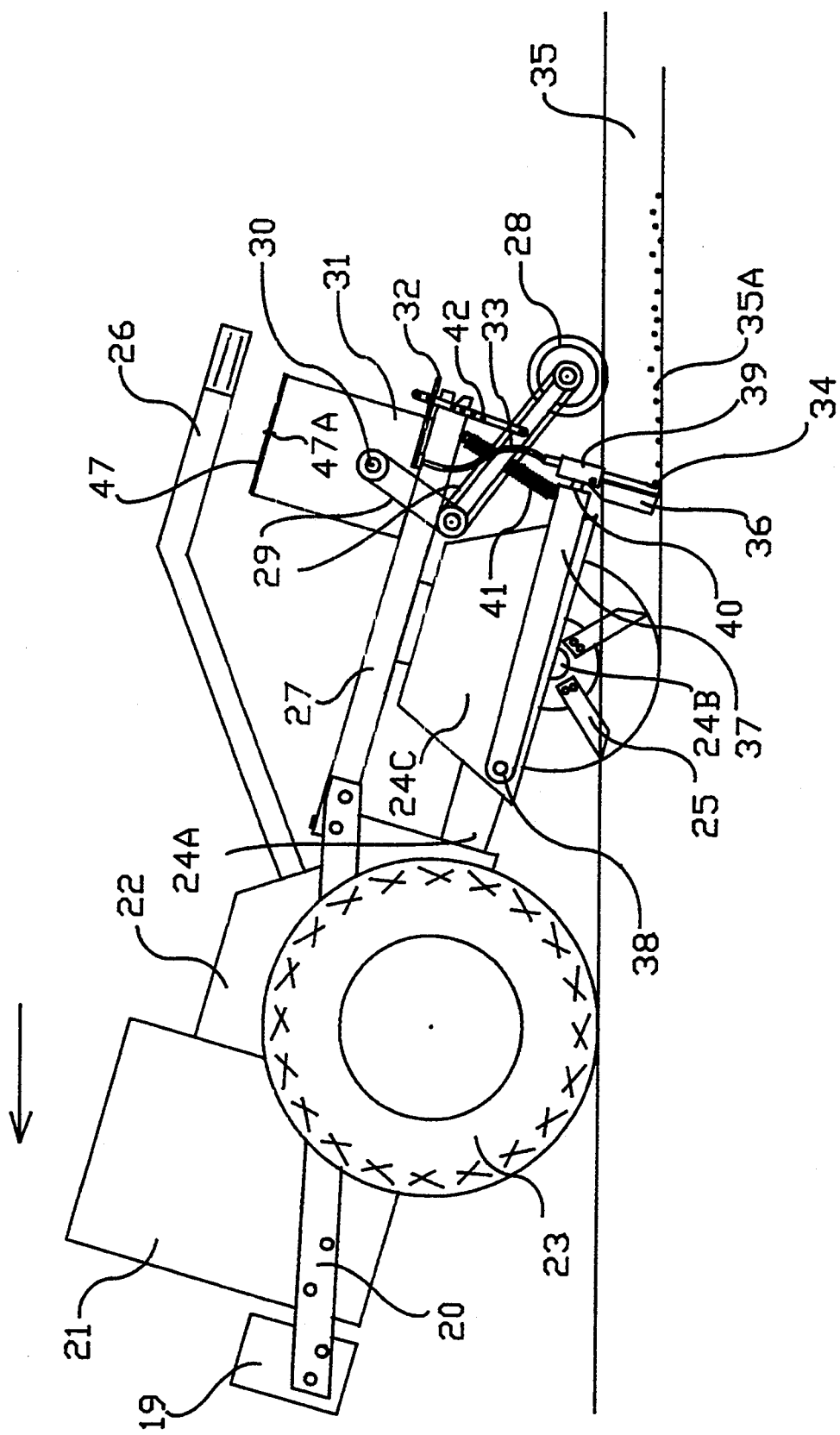
FIG. 2: Side elevational view as in FIG. 1 with reference numerals.

FIG. 2 shows a side view of the entire invention with components indicated by numbers.

Starting from the front of the machine at the left side of FIG. 2, a counter weight (19) is shown held in place by weight mounting plates (20) which are bolted to engine (21) and support frame (27). Transmission (22) connects engine (21) to propulsion wheels (23) and power take off (24A). The direction of the Machine is controlled by an operator who walks behind the machine using control handles (26). Cutter blades (25) are powered by engine (21) through power take off (24A) and cutter drive shaft (24B).

Cutter blades (25) rotate in a vertical plane cutting slits (35) and aerating the soil when lowered into the existing turf beneath them by the operator using control handles (26). A cover (24C) protects the operator from the whirling blades and debris that may be thrown up. Support frame (27) is bolted to transmission housing (22) and to cover (24C). The material to be inserted into the turf is put into material hopper (31) mounted on support frame (27), and a hopper lid (47) is put on top of hopper (31) and is held in place by hopper lid retaining pins (47A). A measurement wheel (28) rolls on the turf as the machine moves forward. Measurement wheel (28) drives a material hopper vane shaft (30) through measurement drive belts (29). The supply of material from material hopper (31) is determined by the rate of rotation of material hopper vane shaft (30), and the position of a material valve control handle (32). The material is delivered to material insertion tubes (34), located in slits (35) cut in the turf by cutter blades (25), through flexible material delivery tubes (33). Material insertion tubes (34) are mounted on a gimbal mechanism comprised of swing arms (37) and tilt arm (39). Swing arms (37) rotate about swing arm pivots (38), and tilt arm (39) rotates about a tilt arm pivot (40) (See detail in FIG. 5, insertion tube gimbal assembly). This allows the material insertion tubes (34) to free float and to follow the contour of the bottom of slits (35) cut into the turf. A swing arm spring (41) forces material insertion tubes (34) to the bottom of slits (35) through the swing arm (37) and tilt arm (39) gimbal mechanism. Protective fins (36) are mounted in line ahead of material insertion tubes (34) to protect them in case an obstruction is encountered. The depth of slits (35) cut by cutter blades (25) is determined by the position of a depth control arm (42). Depth control arm (42) raises or lowers measurement wheel (28) with respect to support frame (27) thereby lowering or raising cutter blades (25) in the turf, the rear of the entire machine pivoting about propulsion wheels (23) (See details in FIGS. 12 and 13).

Figure 3:
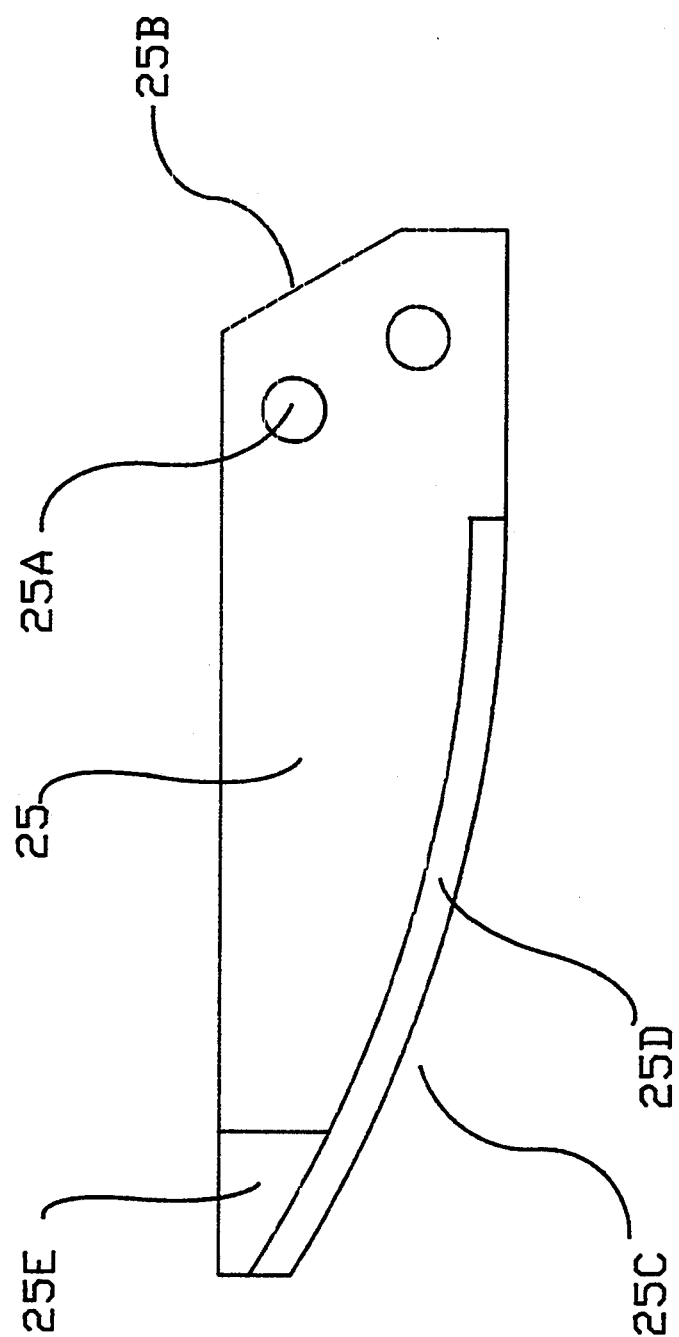
FIG. 3: Detail of a Cutter Blade.

FIG. 3 shows detail views of cutter blade (25). Cutter blade (25) is mounted on a cutter drive shaft (24B) by bolts through two mounting holes (25A). A clearance chamfer (25B) allows mounting clearance on shaft (24B). Cutter blade (25) is made from flat steel stock and has a cutting edge radius (25C), a sharpened edge (25D), and a tip (25E) tappered from each side of the flat surfaces to improve ease of cutting.

Figure 4:
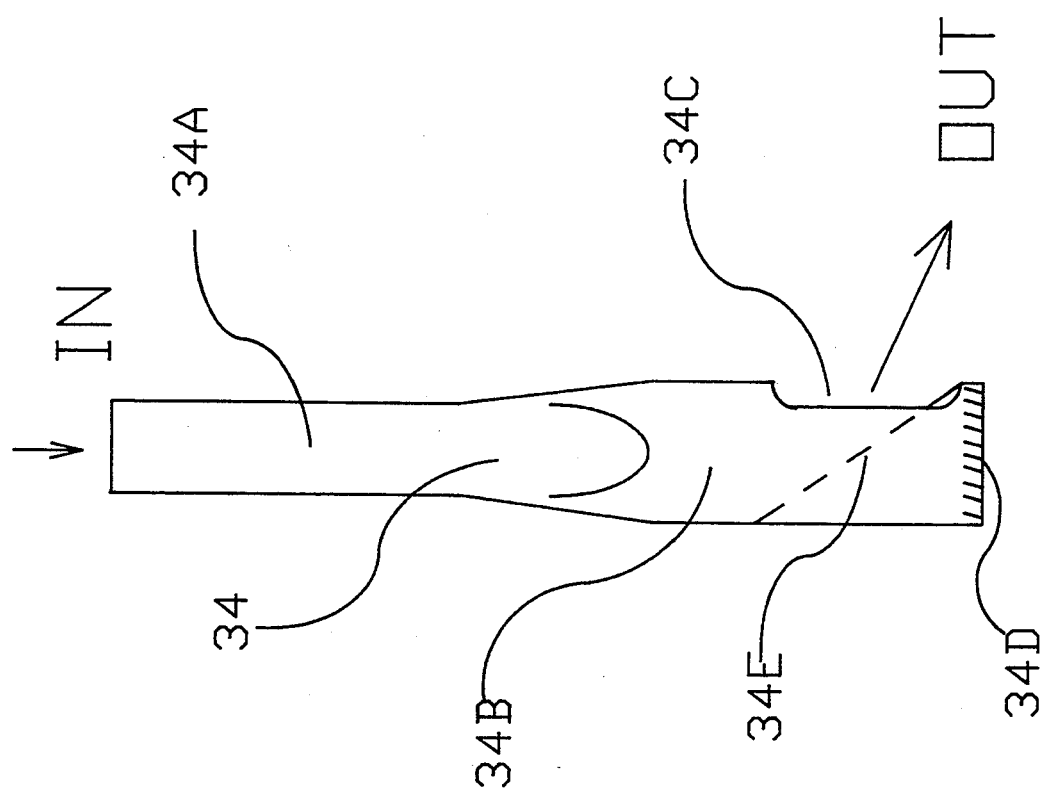
FIG. 4: Detail of a Material Insertion Tube.

FIG. 4 shows a detail side view of material insertion tube (34). A round section (34A) leads into a flattened section (34B) with a rear facing exit port (34C) cut in the trailing edge. A pinched shut end (34D) closes the bottom of the tube to a planar configuration. An internal ramp (34E) directs the material which enters the top of the tube at "IN", out the rear exit port (34C) at "OUT".

FIG. 5 shows an isometric detail view of the insertion tube gimbal assembly. This assembly is mounted on the machine at the forward edge of cover (24C) at swing arm pivot (38) on each side of the machine. Swing arm (37) allows material insertion tubes (34) to go up and down to follow the depth of cut in slits (35). Tilt arm (39) rotates about tilt arm pivot (40) allowing one end of the row of material insertion tubes (34) to go down while the other end goes up, allowing a free floating movement of the insertion tubes independent of machine tip and tilt motion, thus following the bottom of the cut slits in uneven terrain. Each material insertion tube (34) has a protective fin (36) mounted ahead of it to protect it from obstructions. Each material insertion tube (34) is mounted to tilt arm (39) by an insertion tube mounting block (48) and each protective fin (36) is mounted on tilt arm (39) by a protective fin mounting block (49).

Figure 6A:
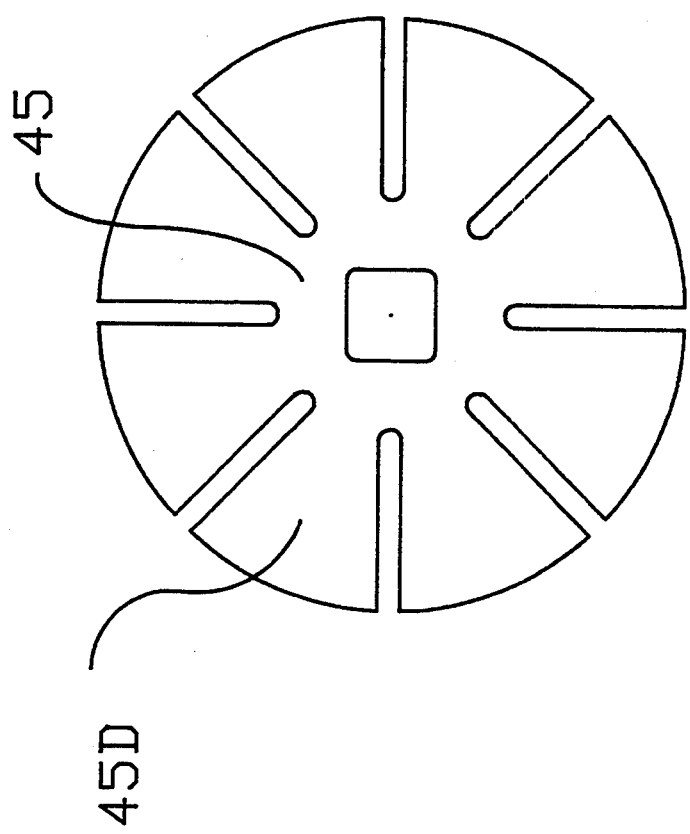
FIG. 6A: Detail of Material Hopper Vane Blank.
Figure 6B:
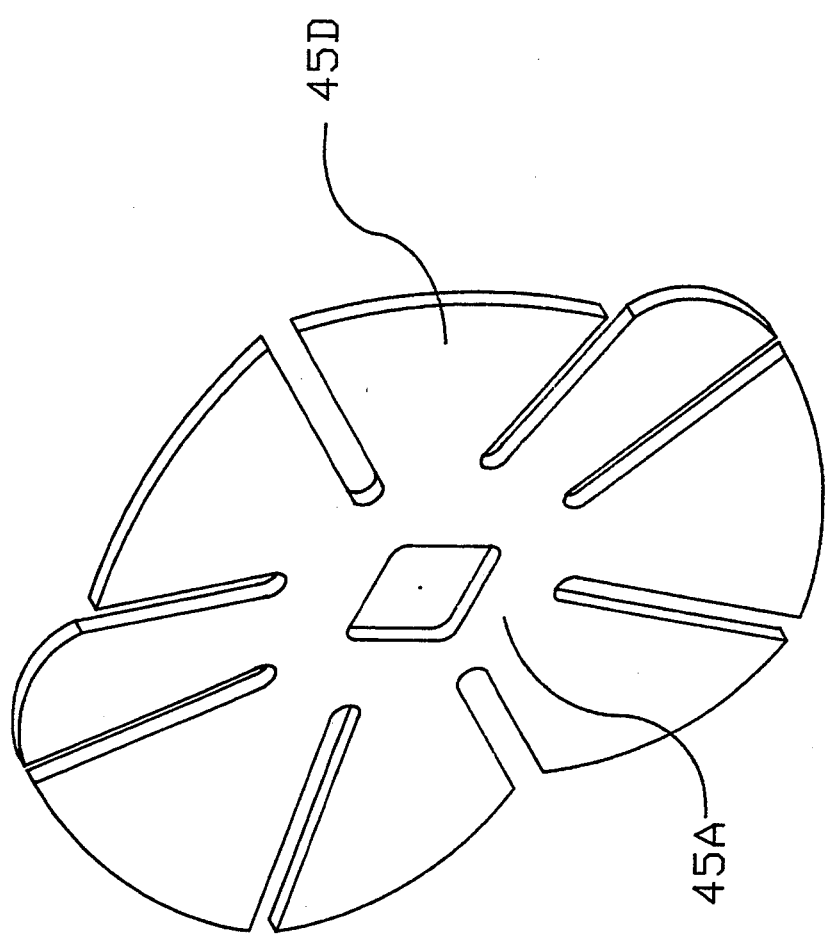
FIG. 6B: Detail of Wave Type Vane.
Figure 6C:
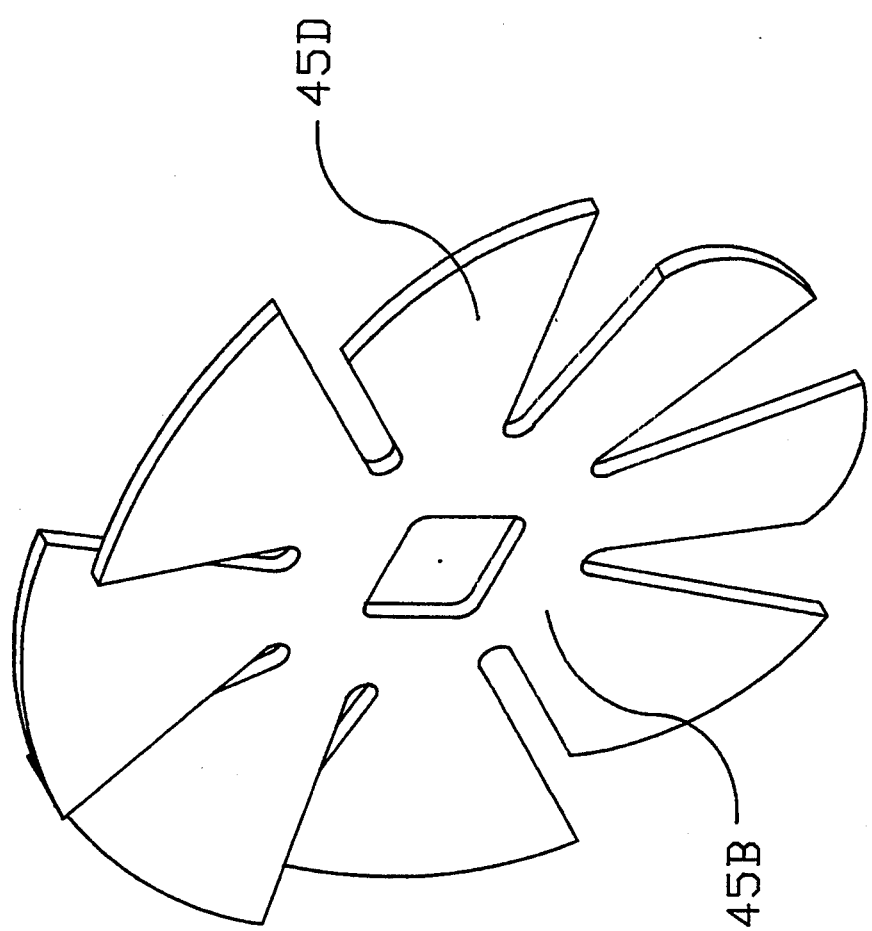
FIG. 6C: Detail of Screw Right Vane.
Figure 6D:
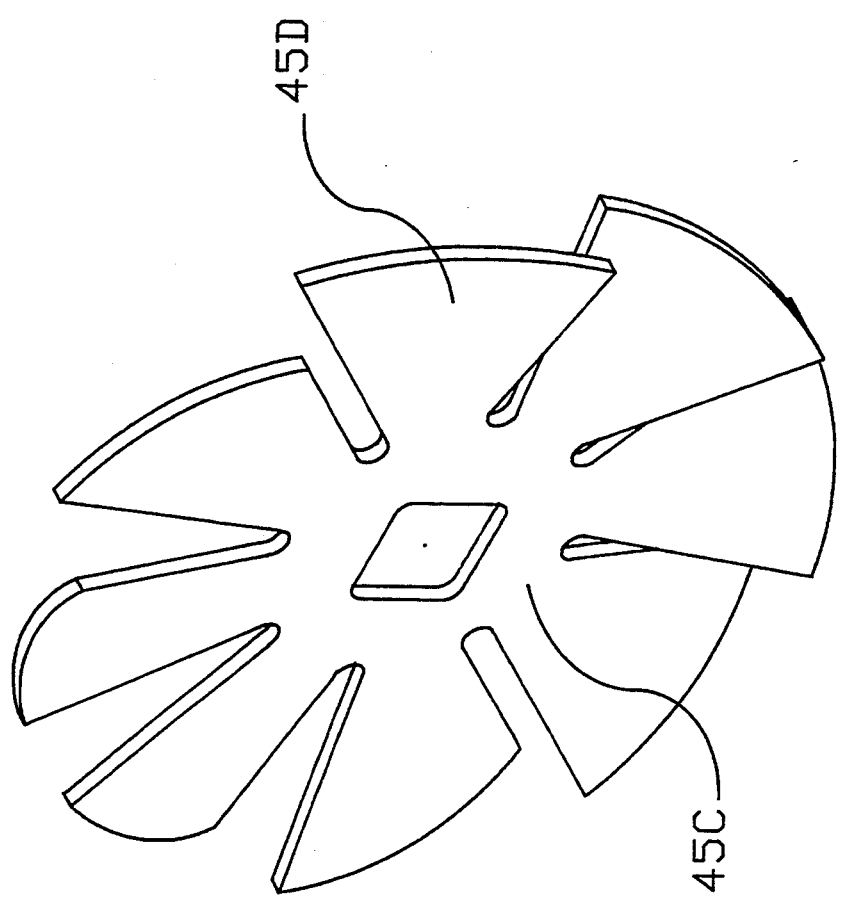
FIG. 6D: Detail of Screw Left Vane.

FIG. 6A shows a material hopper vane blank (45) with twistable blades. The wave type vane (45A) is shown in FIG. 6B. This uses the common blank shown in FIG. 6A. Blades (45D) are twisted in alternate directions so that when vane (45A) is rotated on shaft (30), the effect is a sweeping motion side to side at the periphery of the vane in line with the shaft axis. The screw right type vane (45B) FIG. 6C has all of its blades (45D) twisted in the same direction so as to move the material in material hopper (31) toward the right as the vane rotates. The screw left type vane (45C) FIG. 6D has all of its blades (45D) twisted in the opposite direction of vane (45B) so as to move the material in material hopper (31) toward the left as the vane rotates. (See rotation direction FIG. 7, vane shaft assembly).

Figure 7:
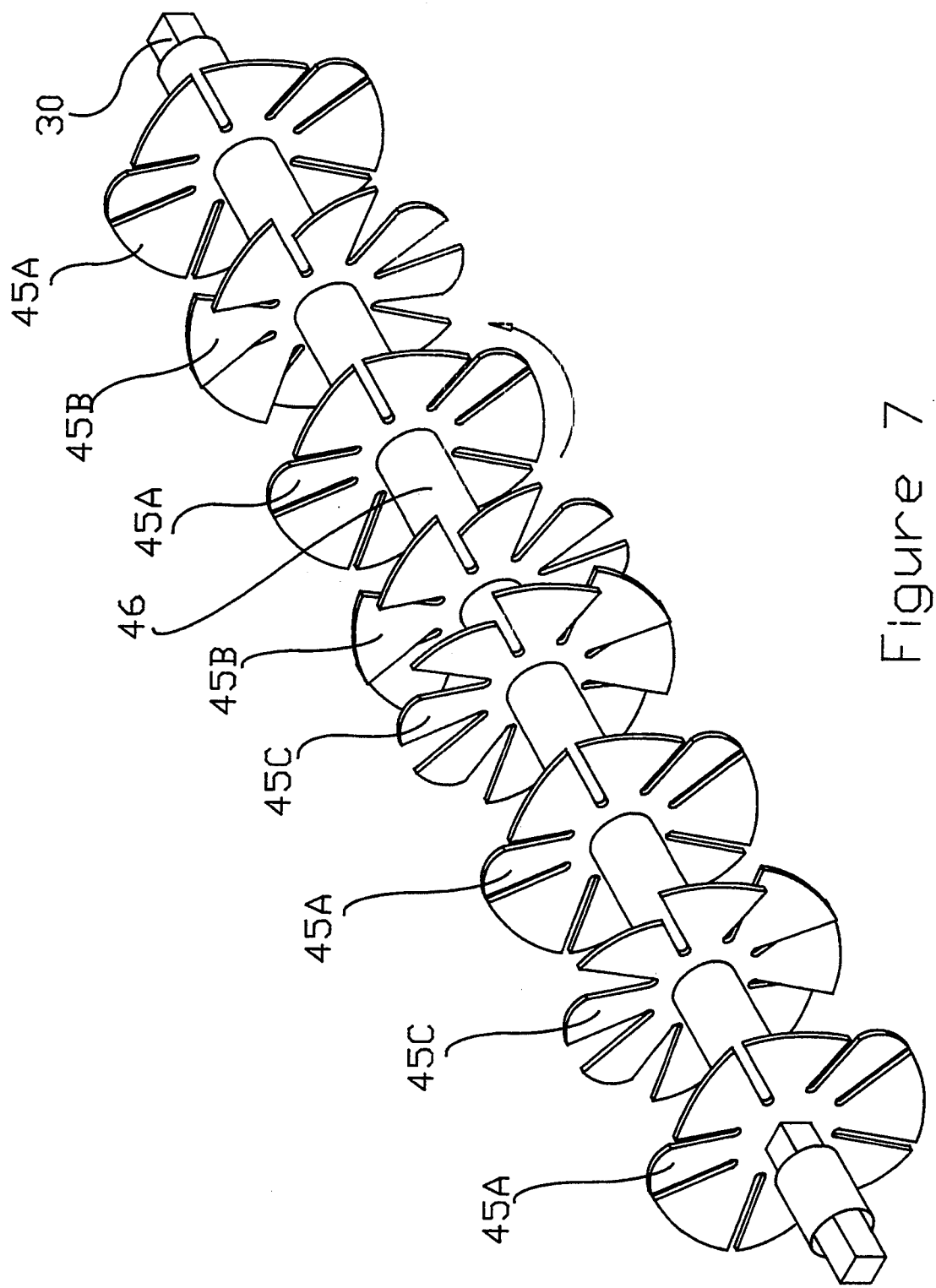
FIG. 7: Isometric view of the Vane Shaft Assembly.

FIG. 7 shows an isometric view of the vane shaft assembly. Wave type vanes (45A), screw right type vanes (45B), and screw left type vanes (45C) are mounted on material hopper vane shaft (30) which rotates in the direction shown by the arrow. The vanes are separated by vane spacers (46). The effect of the screw type vanes is to move material from the center of material hopper (31) toward each end of the hopper to insure a constant supply of material to all hopper bin outlet ports (44).

Figure 8:
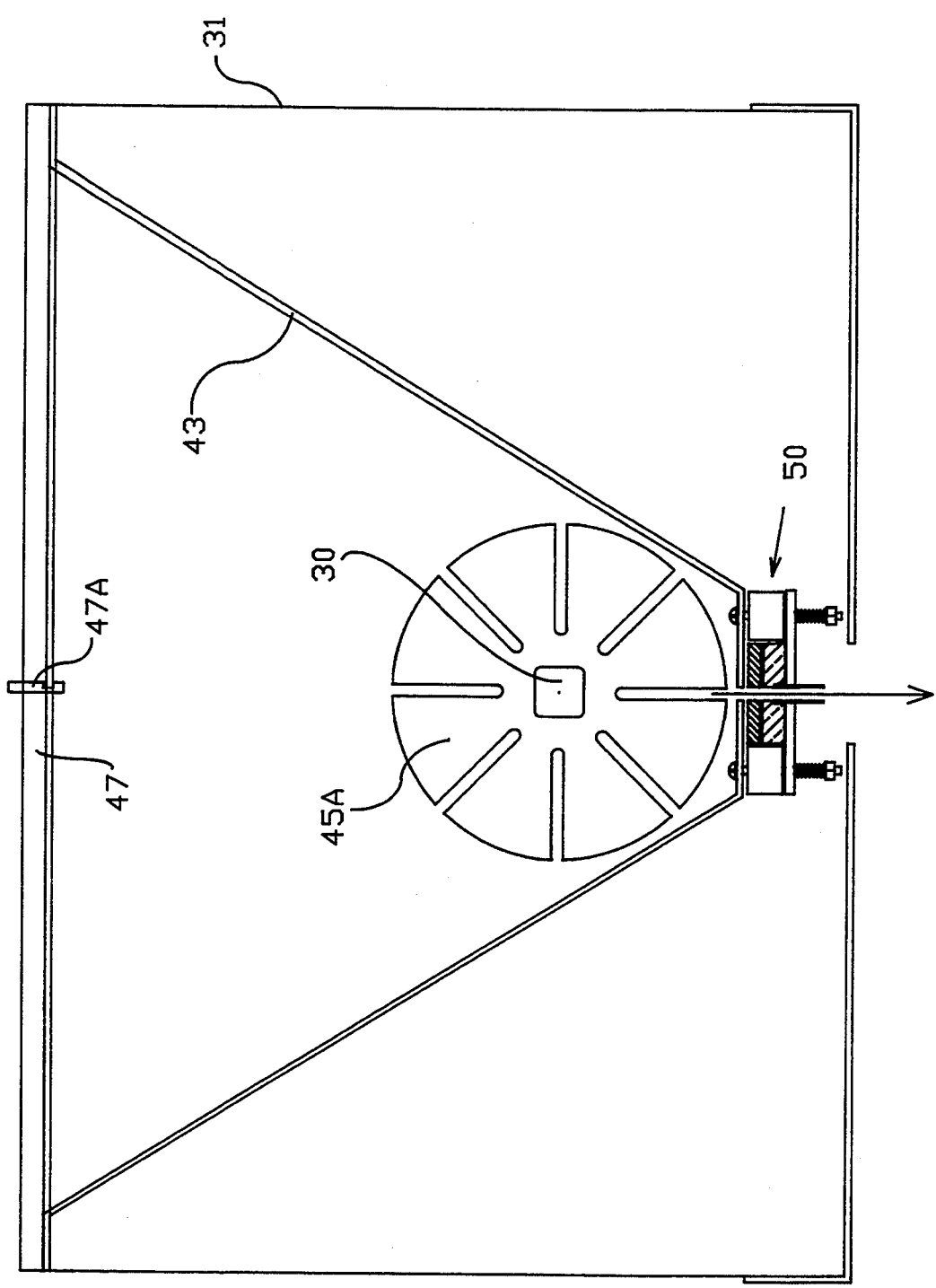
FIG. 8: Cross sectional view of the Material Hopper and Material Valve.

FIG. 8 shows a cross-section view of material hopper (31) and valve assembly (50). On top of material hopper (31) is a material hopper lid (47) and hopper lid retainer pin (47A). A hopper bin (43) cross-section is shown. A vane (45A) is shown mounted on vane shaft (30) which rotates vane (45A) just above valve assembly (50) causing material in material hopper bin (43) to flow through valve assembly (50) out the bottom of material hopper (31) at "OUT".

Figure 9:
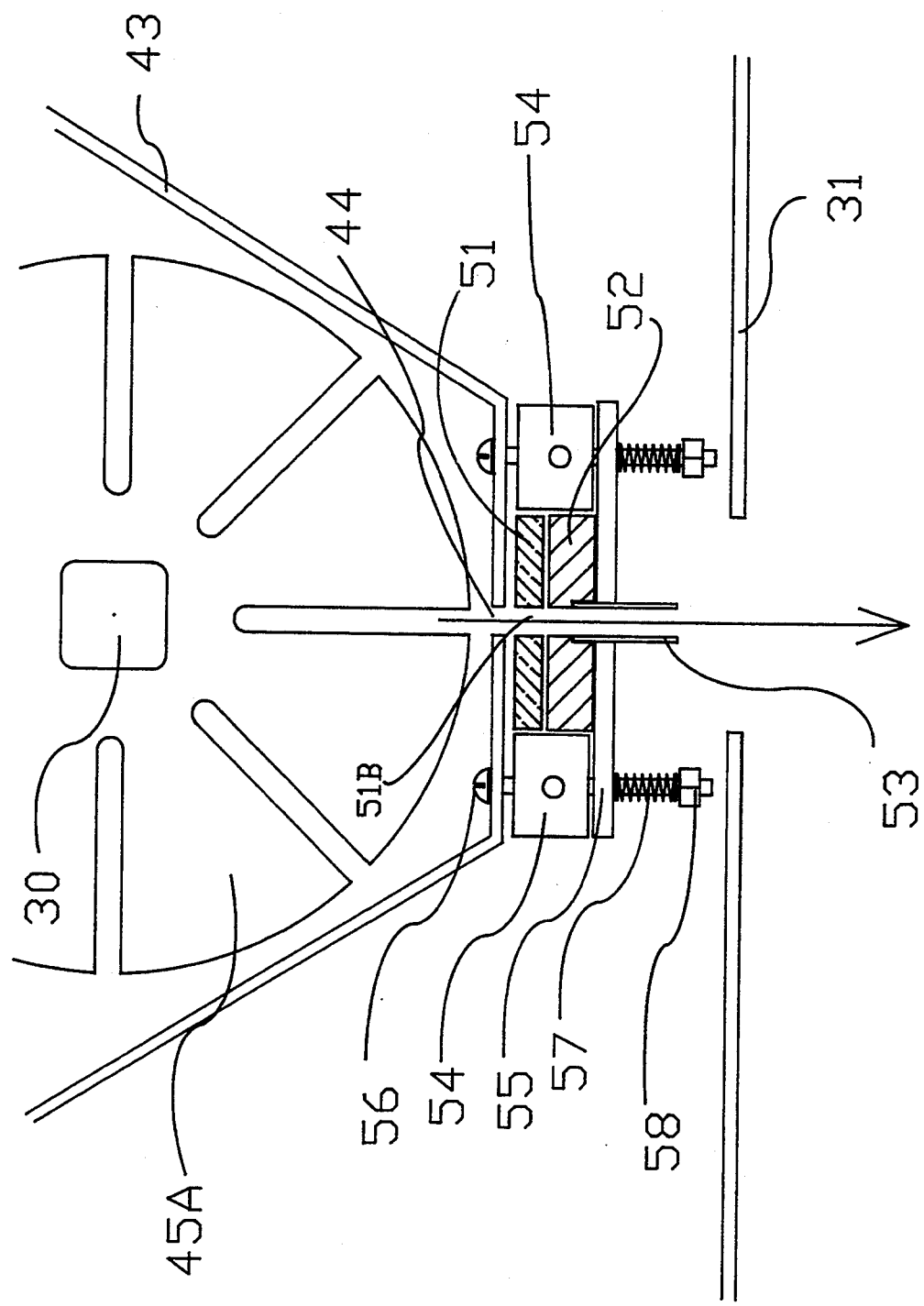
FIG. 9: Cross sectional view of the Material Feed Control Valve.

FIG. 9 shows an enlarged view of the material valve assembly. Material hopper bin (43) mounted in material hopper (31) contains a vane shaft assembly as shown in FIG. 8. This assembly is represented in FIG. 9 by the vane (45A) mounted on vane shaft (30). Vanes (45A) are rotated by vane shaft (30) above bin outlet ports (44) in hopper bin (43). Only the wave type vane is shown since it is the type that is used over each bin outlet port (44). Material is moved over each bin outlet port (44) by its respective wave type vane (45A), and the material therefore falls into the bin outlet port (44). A value slide (51) is positioned below the bin outlet port holes (44). Valve slide (51) has corresponding holes in size and position to those of bin outlet ports (44) when valve slide (51) is in its fully open position. Moving valve slide (51) along its length will shift its holes with respect to those in the bottom of hopper bin (43), thus closing off the bin outlet ports (44) and allowing less material to pass through.

A valve pressure bar (52) is located under material valve slide (51). Valve pressure bar (52) applies pressure to the bottom side of material valve slide (51) to cause it to press against the bottom surface of hopper bin (43) so as to seal around bin outlet ports (44). Valve pressure bar (52) does not move along its length, but it has holes and material exit nipples (53) in line with bin outlet ports (44). Material flowing through bin outlet ports (44) and material valve slide holes (51B) falls through the holes in valve pressure bar (52) and material exit nipples (53). The rate of flow of material to the insertion tubes is predetermined by the opening setting chosen for the material valve slide (51) and the rotational speed of vanes (45A) as driven by measurement wheel (28) due to machine forward motion. Flexible material delivery tubes (33) shown in FIG. 2 are connected to material exit nipples (53) and conduct the material to the top end of material insertion tubes (34) as shown in FIG. 2. Flexible material delivery tubes (33) are made of clear plastic tubing and the ends of the tubes are inserted into the larger round top end of material insertion tubes (34). This allows the flexible plastic material delivery tubes (33) to slide in and out of the top of material insertion tubes (34) as material insertion tubes (34) move up and down following the uneven terrain of the turf.

Two valve guide rails (54) capture material valve slide (51) and valve pressure bar (52) on each side to keep them aligned with bin outlet ports (44) in the bottom of hopper bin (43). Valve guide rails (54) also provide mounting holes for material valve assembly (50) to be fastened to the bottom of hopper bin (43) by machine screws (56) as shown in FIGS. 8, 9 and in the exploded view of FIG. 10. Pressure springs (57), mounted on machine screws (56), and held in place by pressure adjust nuts (58), apply pressure to material valve slide (51) and valve pressure bar (52) through pressure plates (55). Two such pressure plate (55) assemblies are used. One near each end of material valve assembly (50) (although only one is shown in FIGS. 8, 9 and 10 for clarity sake).

Figure 10:
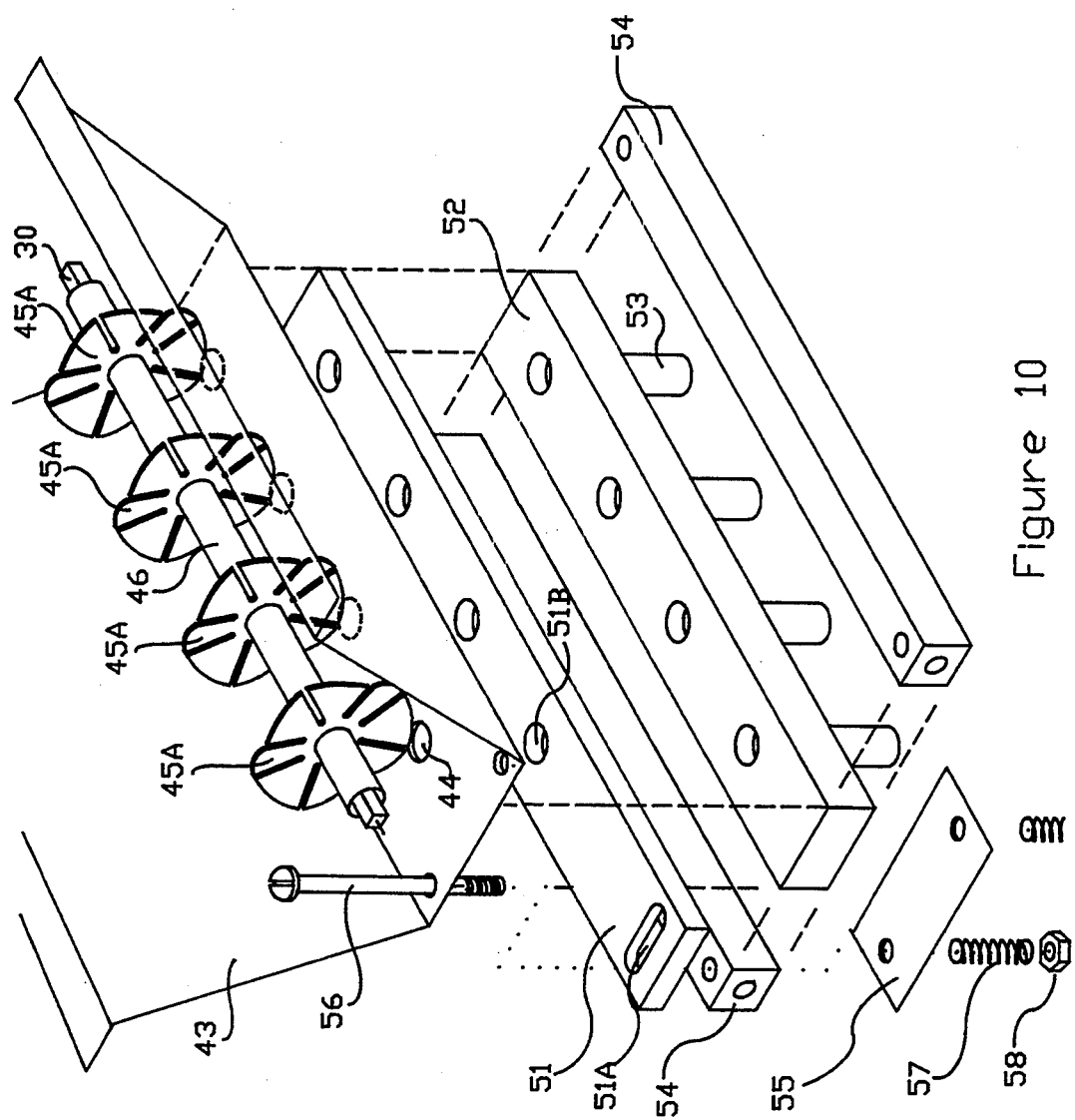
FIG. 10: Exploded isometric view of the Material Feed Control Valve Assembly.

FIG. 10 shows an exploded view of material valve assembly, hopper bin, and vane shaft assembly. The vane shaft assembly in FIG. 10 has only the wave type vanes shown for clarity sake. Hopper bin (43) has the vane shaft assembly with each vane (45A) positioned over a corresponding bin outlet port (44). Vanes (45A) are separated and held in position on the vane shaft (30) by vane spacers (46).

Machine screws (56) fasten material valve assembly and hopper bin (43) together. Only one machine screw (56) is shown for clarity. Machine screws (56) also are used to mount valve pressure plates (55) and pressure springs (57) underneath valve pressure bar (52) by use of pressure adjust nuts (58). Material valve slide (51) is captured between valve pressure bar (52) and the bottom of material hopper bin (43), with spring pressure applied by pressure spring (57) - valve pressure plate (55) combination from below. This pressure insures that the openings afforded by bin outlet ports (44) and corresponding material valve slide ports (51B) will seal properly and shut off the flow of material when the material valve is closed. Material valve slide (51) has a valve slide control slot (51A) that is used to control the motion of opening and closing the valve by a control handle shown in FIG. 11 material valve control. Material valve slide (51) is constrained to move only along its length by two valve guide rails (54) which fit closely on each side of material valve slide (51). Valve guide rails (54) also act to mount the material valve assembly to the bottom of material hopper bin (43) by use of machine screws (56).

Figure 11:
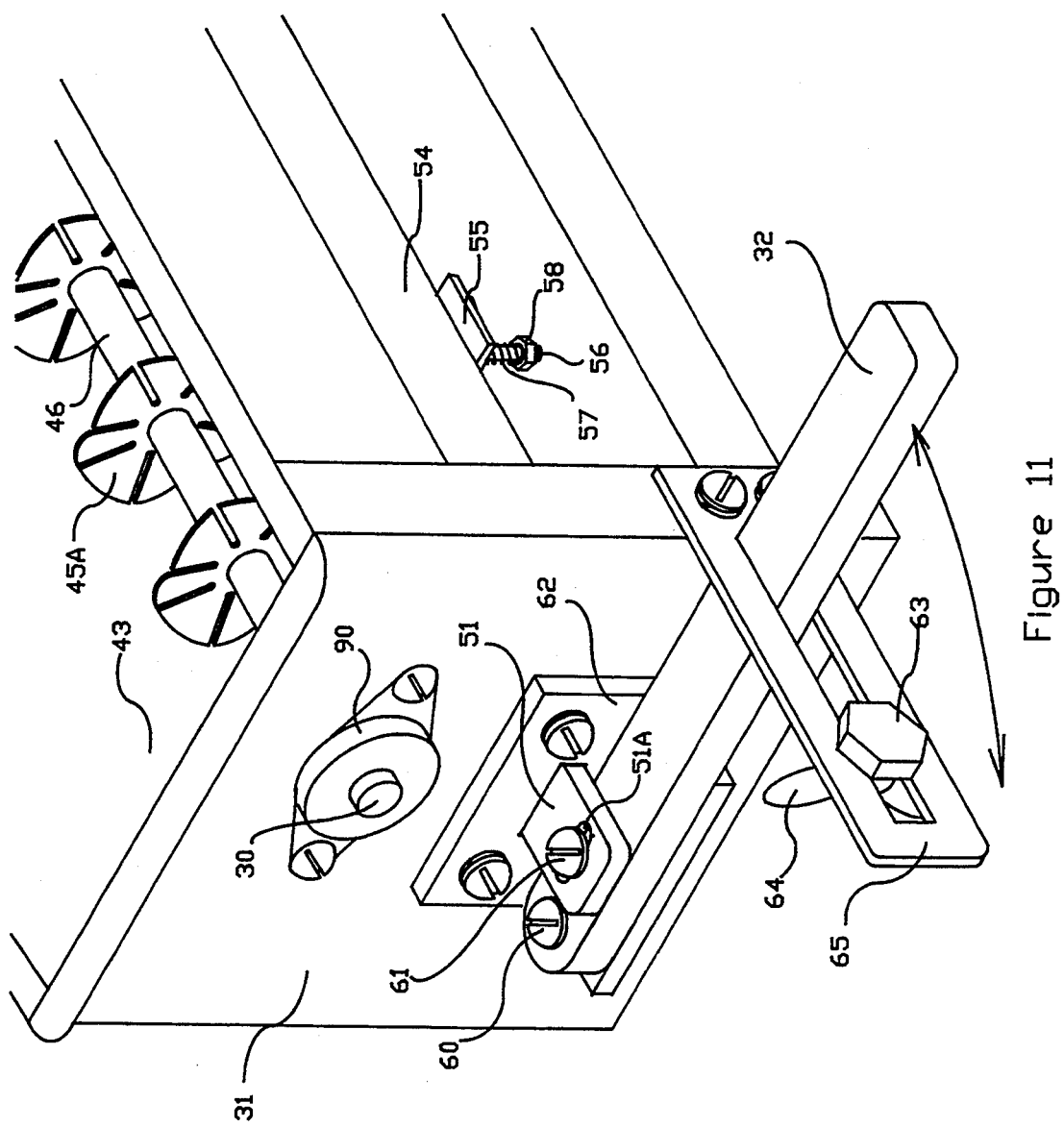
FIG. 11: Isometric view of the Material Feed Valve Control Mechanism.

FIG. 11 shows the material valve control mechanism which is mounted at one end of material hopper (31). A material valve control handle (32) is mounted at material valve control handle pivot (60), which is screwed onto control handle pivot bracket (62). Pivot bracket (62) is mounted on the end of material hopper (31) with screws that thread into the ends of valve guide rails (54). The end of material valve slide (51) projects through a slot in control handle pivot bracket (62). A material valve slide link (61) passes through material valve control slot (51A) and is fastened to material valve control handle (32) with screw. As material valve control handle (32) is moved back and forth, material valve slide (51) slides in and out, closing and opening material valve (50) which controls the flow of material from material hopper bin (43) to material insertion tubes (34) of FIG. 2. A control handle stop (63) is held in place on a control handle stop guide (65) by a control handle stop wing nut (64). By adjusting the position of control handle stop (63) on control handle stop guide (65), the size of the maximum opening of material valve (50) is set. A valve pressure plate (55) is held in place by a machine screw (56) to a valve guide rail and pressed upward by a pressure spring (57). Valve pressure plate (55) applies the pressure required to provide frictional holding of control handle (32) against stop (63) FIG. 11 and to seal material valve (50) as shown in FIG. 9 material valve assembly. A vane shaft assembly, as shown in FIG. 7, is held in place in material hopper (31) by pillow block bearings (90) at each end of vane shaft (30). Vane shaft (30) is driven from the end opposite to the one shown in FIG. 11.

Figure 12:
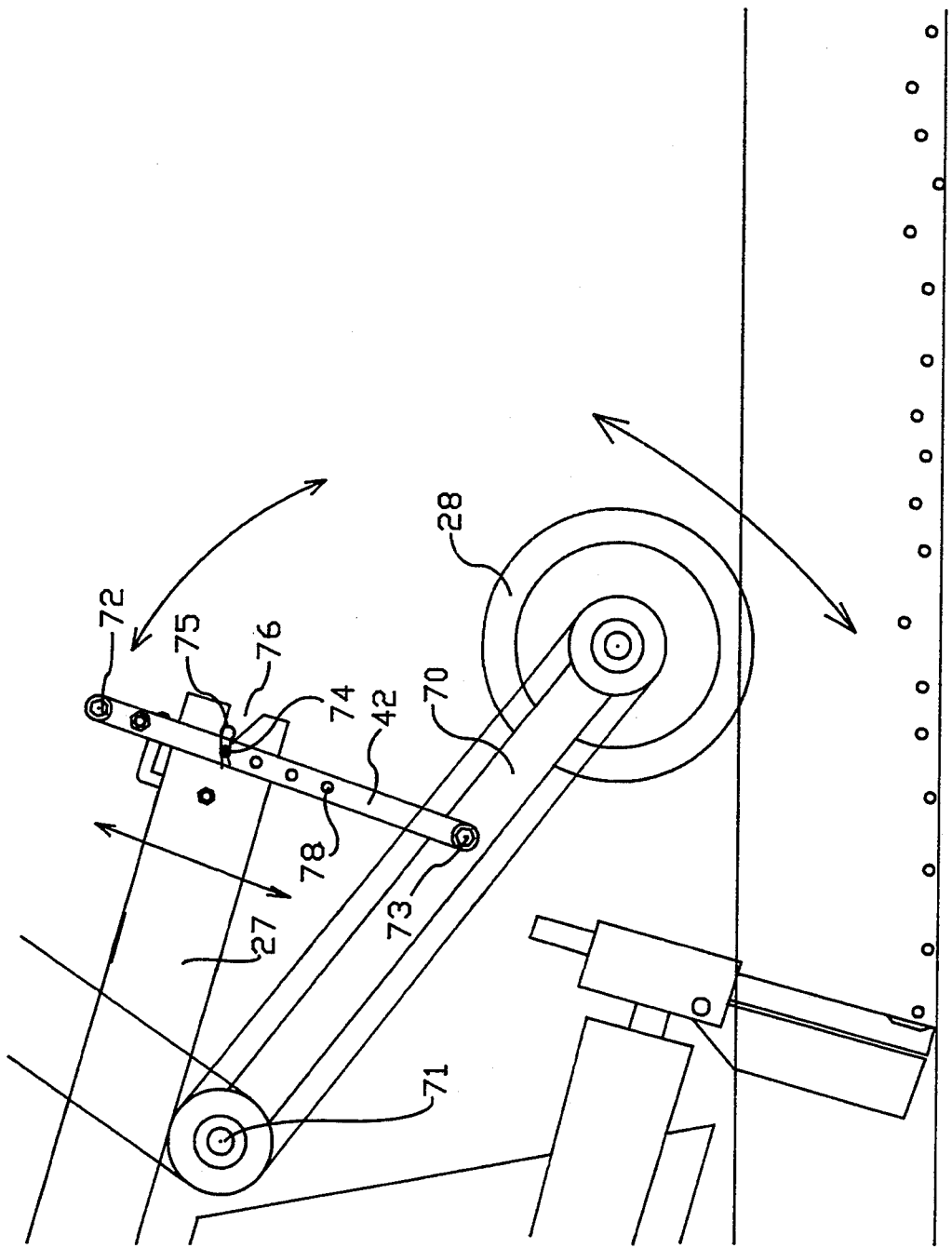
FIG. 12: Side view of the Depth Control Mechanism.

FIG. 12 shows the depth control mechanism. A measurement wheel (28) serves a dual purpose. It measures the forward motion of the machine, and positions the rear end of the machine up and down, thus controlling the depth of cut into the turf by cutter blades (25). The position of measurement wheel (28) with respect to support frame (27) is maintained by a depth control arm (42). Depth control arm (42) is connected to a measurement wheel arm (70) at a depth control arm pivot (73). Measurement wheel arm (70) swings about a measurement wheel arm pivot (71) mounted on support frame (27). A depth control pin (74) in a depth control notch (76) in support frame (27) locates the upper portion of depth control arm (42) by passing through one of the depth control adjustment holes (78). The depth of cut in the turf can be changed by inserting depth control pin (74) through a different depth control adjustment hole (78). Depth control pin (74) is kept in place in the chosen depth control adjustment hole (78) by a depth control pin clip (75). A depth control arm handle (72) allows rapid depth adjustment by swinging depth control arm (42) out, pulling depth control pin (74) out of said depth control notch (76). Depth control pin (74) can then be moved to a different depth control adjustment hole (78) and then be snapped back into depth control notch (76) to set the new depth of cut.

Figure 13:
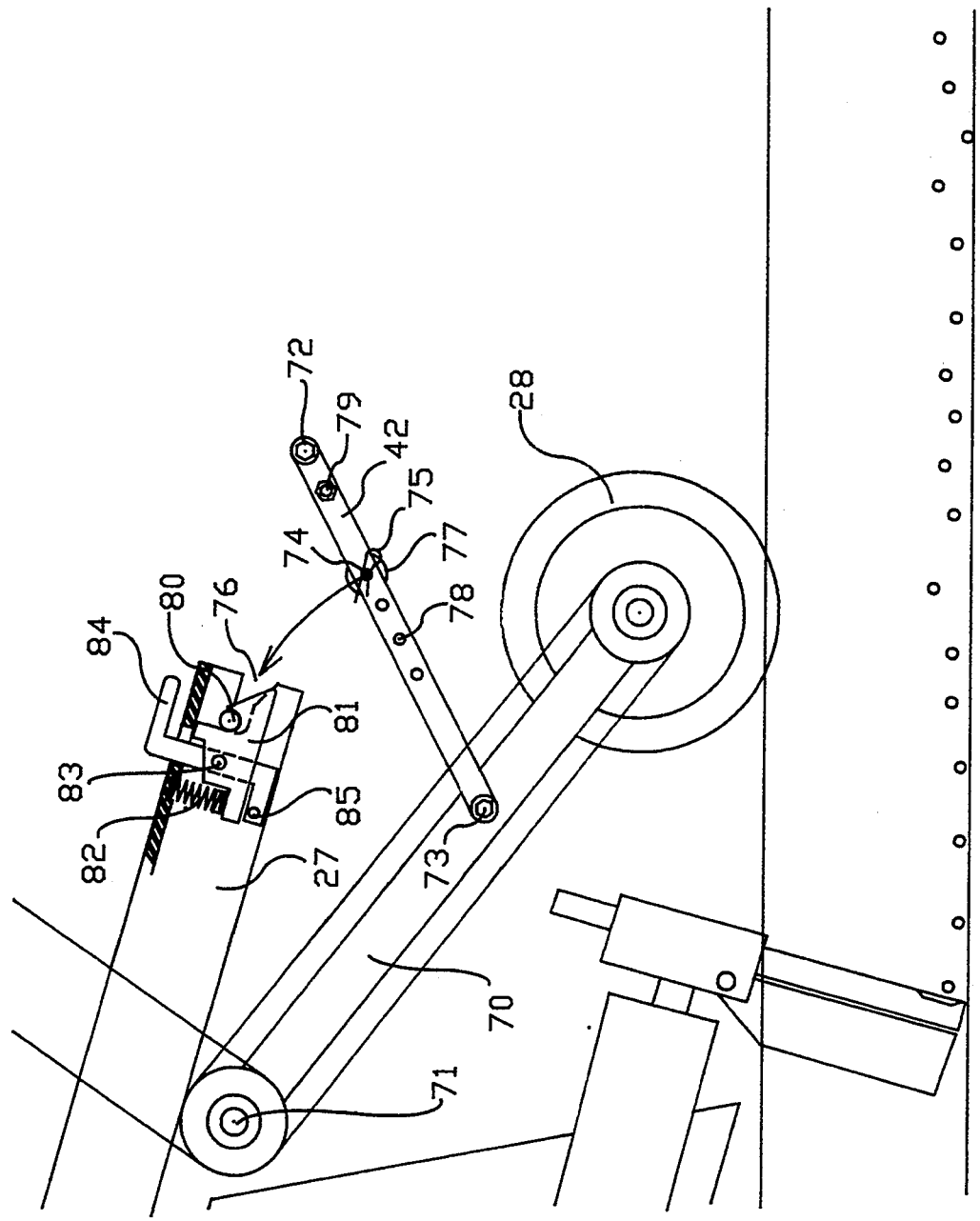
FIG. 13: Side view of the Depth Control Latch.

FIG. 13 shows the depth control latch mechanism with depth control arm (42) swung out, allowing a change in cutting depth adjustment. A measurement wheel (28) is mounted on the end of a measurement wheel arm (70) which swings about a measurement wheel arm pivot (71). A depth control arm (42) is connected to measurement wheel arm (70) at a depth control arm pivot (73). A depth control pin (74) is located in a depth control adjustment hole (78), and is kept there with a depth control pin clip (75). A depth control pin knob (77) can be seen at the opposite end of depth control pin (74). At the top end of depth control arm (42) is a depth control handle (72) which is used to swing depth control arm (42) in and out of the latch position. Located just below depth control arm handle (72) is a taxi position bolt (79). Taxi position bolt (79) acts as a fixed depth control pin which raises the rear of the machine high enough so that cutters (25) will clear the ground. This position is used for maneuvering the machine between insertion runs. When depth control pin (74) or taxi position bolt (79) is swung into the depth control notch (76) located in support frame (27), a depth control pin latch (81) catches the pin or bolt and locks it into a depth control pin socket (80). Depth control pin latch (81) rotates about a depth control latch pivot (83), and is held in position by a depth control latch spring (82). Since the entering face of depth control pin latch (81) is a ramp, depth control pin (74) will push depth control pin latch (81) down as depth control pin (74) snaps into depth control pin socket (80). Spring pressure on depth control pin latch (81) will then keep depth control pin (74) in depth control pin socket (80) until released by a depth control latch release (84). Depth control latch release (84) rotates about depth control latch pivot (83) and will release depth control pin latch (81) when depressed, by means of a release pin (85) acting on the bottom of depth control pin latch (81) in an upward direction. Then depth control pin (74) may be withdrawn from depth control pin socket (80) by means of depth control arm handle (72).

Figure 14:
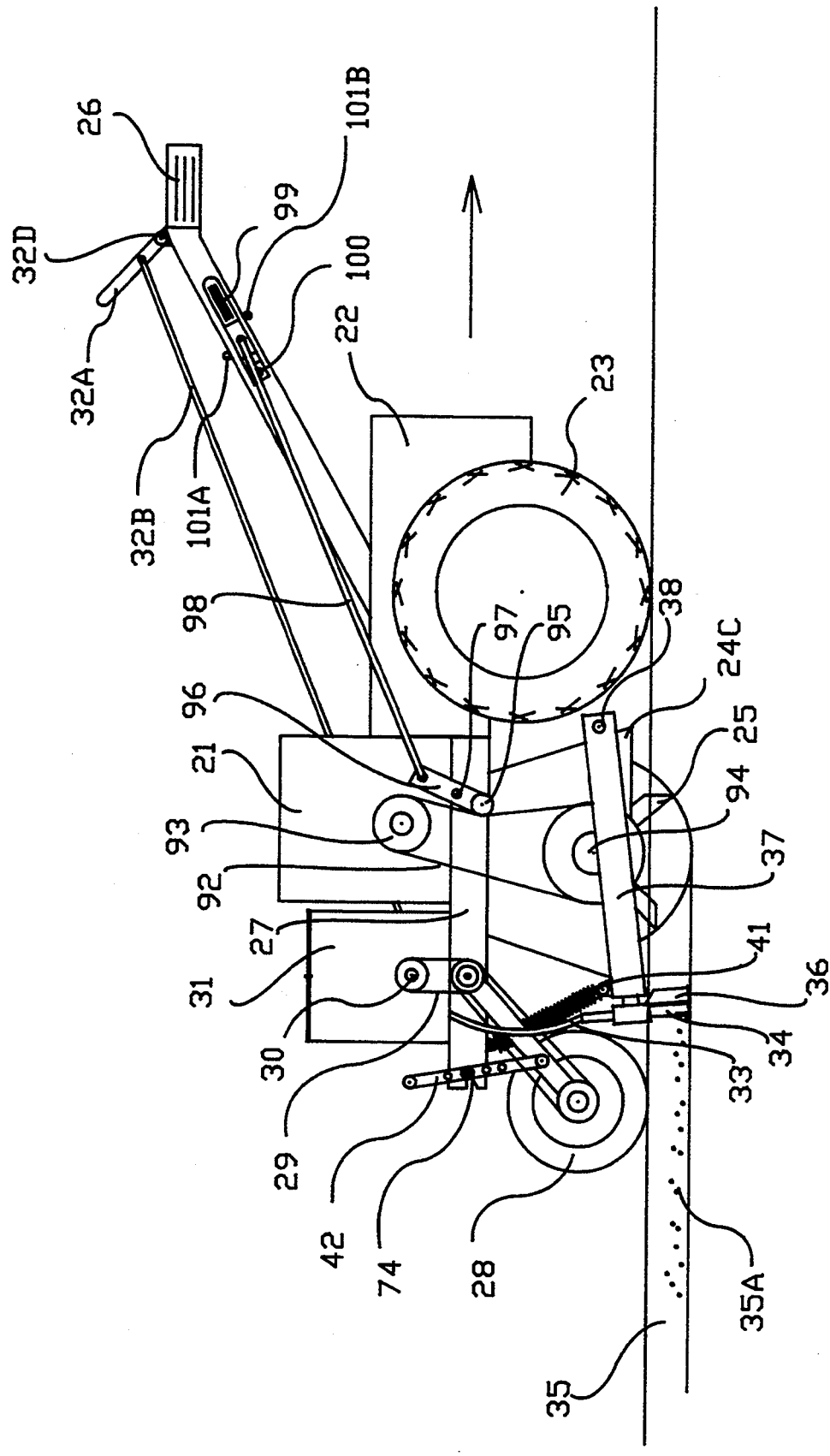
FIG. 14: Side elevational view of another embodiment.

FIG. 14 shows a variation of the entire machine. In this configuration the direction of motion of the machine is in the reverse direction; i.e.: it moves toward the operator instead of away from him. An engine (21) is connected to propulsion wheels (23) by a transmission means (22). The direction of the machine is controlled by an operator who walks ahead of the machine using control handles (26).

An engine pulley (93) powers a cutter blade shaft (94) through a belt (92). Belt (92) tension is provided by a tension roller (95) on a tension arm (96) which swings about a tension arm pivot (97). The other end of arm (96) is activated by a tension rod (98). Tension rod (98) is activated from its other end by a tension handle (99) which swings about a tension handle pivot (100) between two stops (101A) and (101B). Belt (92) is thus tensioned to drive cutter blade shaft (94) or it is relaxed to stop the rotation of shaft (94), by the action of tension handle (99). Cutter blades (25) rotate in a vertical plane cutting slits (35) when lowered into the existing turf beneath them by the operator using control handles (26). A cover (24C) protects the operator from the whirling blades and debris that may be thrown up.

Support frame (27) is bolted to engine (21), transmission housing (22) and to cover (24C). The depth of slits (35) cut by cutter blades (25) is determined by the position of a depth control arm (42). Depth control arm (42) raises or lowers measurement wheel (28) with respect to support frame (27) thereby lowering or raising cutter blades (25) in the turf, the rear of the entire machine pivoting about propulsion wheels (23) (See details in FIGS. 12 and 13). The material to be inserted into the turf is put into material hopper (31) mounted on support frame (27).

A measurement wheel (28) rolls on the turf as the machine moves backward. Measurement wheel (28) drives a material hopper vane shaft (30) through measurement drive belts (29). The supply of material from material hopper (31) is determined by the rate of rotation of material hopper vane shaft (30), and the position of a valve remote control handle (32A). The material is delivered to material insertion tubes (34), located in slits (35) cut in the turf by cutter blades (25), through flexible material delivery tubes (33). Material insertion tubes (34) are mounted on a gimbal mechanism comprised of swing arms (37) and tilt arm (39). Swing arms (37) rotate about swing arm pivots (38), and tilt arm (39) rotates about a tilt arm pivot (40) (See detail in FIG. 5, insertion tube gimbal assembly). This allows material insertion tubes (34) to follow the contour of the bottom of slits (35) cut into the turf. A swing arm spring (41) forces material insertion tubes (34) to the bottom of slits (35) through the swing arm (37) and tilt arm (39) gimbal mechanism. Protective fins (36) are mounted in line ahead of material insertion tubes (34) to protect them in case an obstruction is encountered. Material valve (50 FIG. 8) is the same as on the forward machine with the exception of the valve handle control linkage. Since material hopper (31 FIG. 14) is at the opposite end of the machine from the operator, a control rod (32B) is required to connect a control handle (32A) to a bellcrank (32C FIG. 16) which operates a material control valve slide (51).

Figure 15:
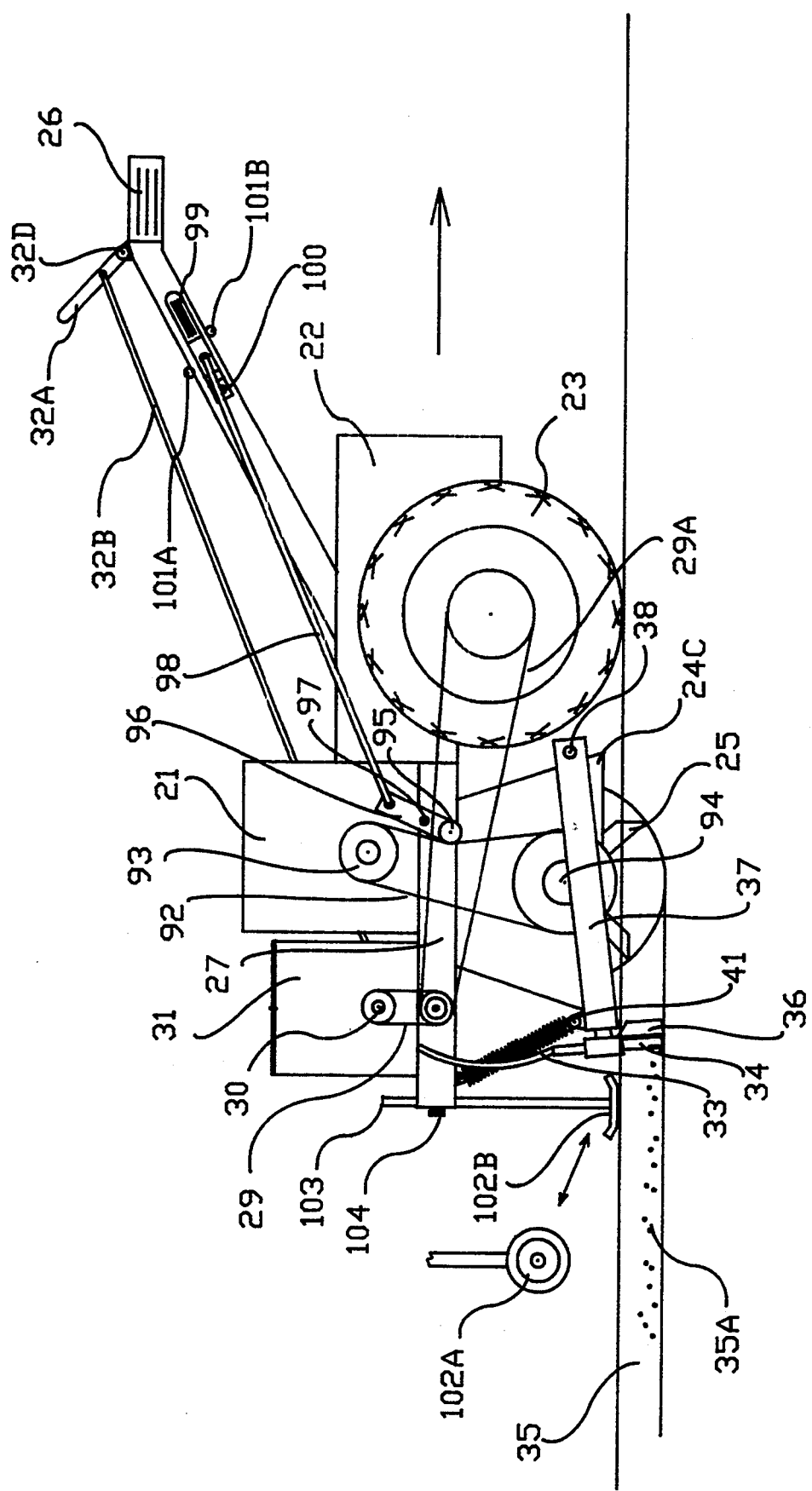
FIG. 15: Side elevational view of a further embodiment.

FIG. 15 shows a configuration similar to FIG. 14 but without the measurement wheel-depth control arm mechanism. In this configuration the direction of motion of the machine is in the reverse direction; i.e.: it moves toward the operator instead of away from him. An engine (21) is connected to propulsion wheels (23) by a transmission means (22). The direction of the machine is controlled by an operator who walks ahead of the machine using control handles (26). An engine pulley (93) powers a cutter blade shaft (94) through a belt (92). Belt (92) tension is provided by a tension roller (95) on a tension arm (96) which swings about a tension arm pivot (97). The other end of arm (96) is activated by a tension rod (98). Tension rod (98) is activated from its other end by a tension handle (99) which swings about a tension handle pivot (100) between two stops (101A) and (101B). Belt (92) is thus tensioned to drive cutter blade shaft (94) or it is relaxed to stop the rotation of shaft (94), by the action of tension handle (99). Cutter blades (25) rotate in a vertical plane cutting slits (35) when lowered into the existing turf beneath them by the operator using control handles (26). A cover (24C) protects the operator from the whirling blades and debris that may be thrown up. Support frame (27) is bolted to engine (21), transmission housing (22) and to cover (24C). The depth control is accomplished by an adjustable wheel (102A) or a sliding foot (102B) on the end of a depth control shaft (103). Shaft (103) is clamped in place by a depth control knob (104).

Shaft (103) is adjusted up or down to set when the wheel (102A) or foot (102B) comes in contact with the turf, thus determining the depth of cut by cutter blades (25). The material to be inserted into the turf is put into material hopper (31) mounted on support frame (27). In this configuration the material vane shaft (30) is driven by belts (29, 29A) connected to the propulsion wheels (23) of the machine. The supply of material from material hopper (31) is determined by the rate of rotation of material hopper vane shaft (30), and the position of a valve remote control handle (32A). The material is delivered to material insertion tubes (34), located in slits (35) cut in the turf by cutter blades (25), through flexible material delivery tubes (33). Material insertion tubes (34) are mounted on a gimbal mechanism comprised of swing arms (37) and tilt arm (39). Swing arms (37) rotate about swing arm pivots (38), and tilt arm (39) rotates about a tilt arm pivot (40) (See detail in FIG. 5, insertion tube gimbal assembly). This allows material insertion tubes (34) to follow the contour of the bottom of slits (35) cut into the turf. A swing arm spring (41) forces material insertion tubes (34) to the bottom of slits (35) through the swing arm (37) and tilt arm (39) gimbal mechanism. Protective fins (36) are mounted in line ahead of material insertion tubes (34) to protect them in case an obstruction is encountered.

Material valve (50 FIG. 8) is the same as on the forward machine with the exception of the valve handle control linkage. Since material hopper (31 FIG. 14) is at the opposite end of the machine from the operator, a control rod (32B) is required to connect a control handle (32A) to a bellcrank (32C FIG. 16) which operates a material control valve slide (51).

Figure 16:
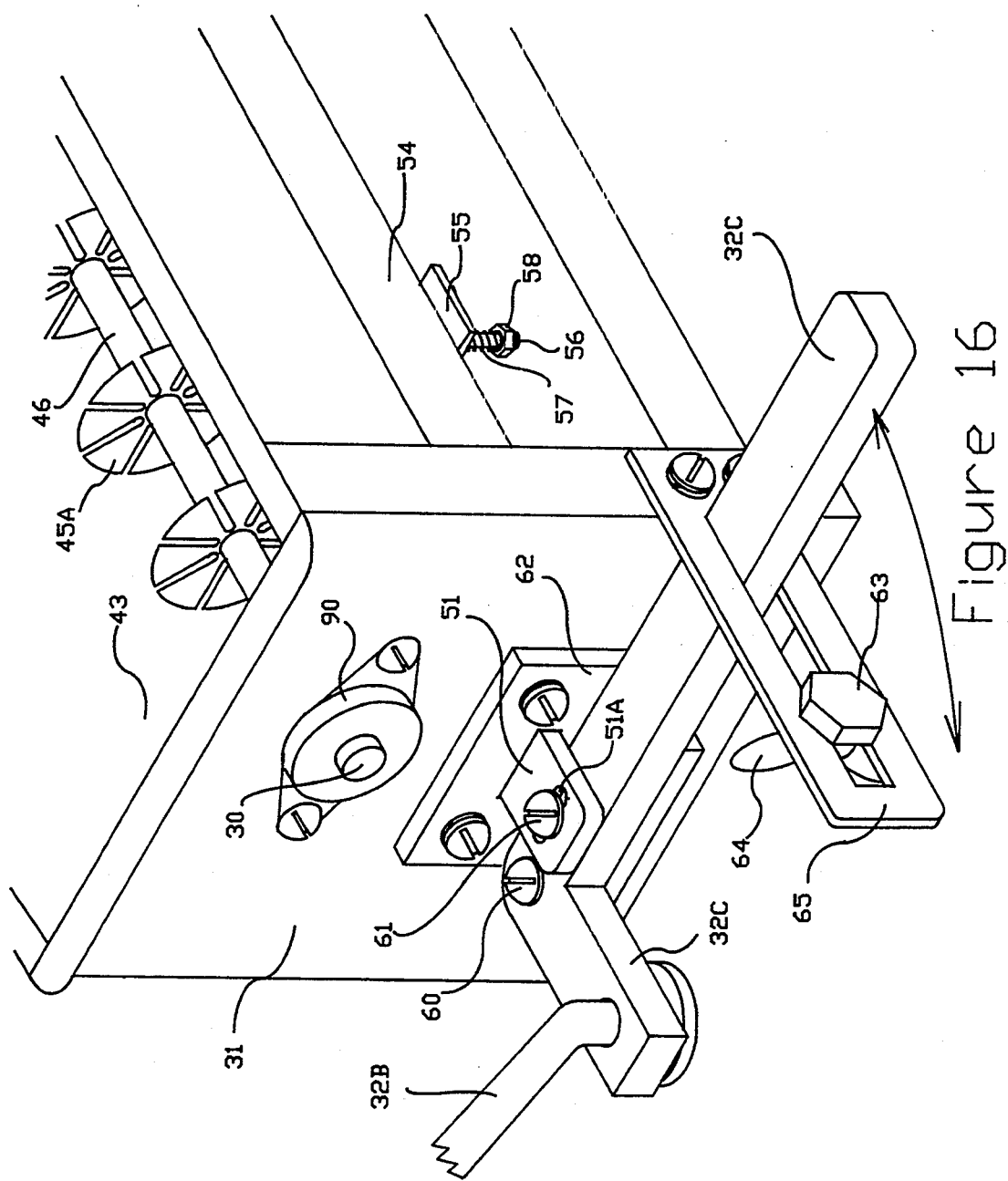
FIG. 16: Isometric view of Reverse Material Feed Valve Control Mechanism.

FIG. 16 shows the remotely controlled material valve. A valve control bellcrank (32C) replaces the valve control handle (32 FIG. 11) so the valve can be controlled from the opposite end of the machine by means of a remote control handle rod (32B). FIG. 16 shows the material valve control mechanism which is mounted at one end of material hopper (31). The valve control bellcrank (32C) is mounted at material valve control handle pivot (60), which is screwed onto control handle pivot bracket (62). Pivot bracket (62) is mounted on the end of material hopper (31) with screws that thread into the ends of valve guide rails (54). The end of material valve slide (51) projects through a slot in control handle pivot bracket (62). A material valve slide link (61) passes through material valve control slot (51A) and is fastened to valve control bellcrank (32C) with a screw.

As valve control bellcrank (32C) is moved back and forth, material valve slide (51) slides in and out, closing and opening material valve (50) which controls the flow of material from material hopper bin (43) to material insertion tubes (34) of FIG. 2. A control handle stop (63) is held in place on a control handle stop guide (65) by a control handle stop wing nut (64). By adjusting the position of control handle stop (63) on control handle stop guide (65), the size of the maximum opening of material valve (50) is set. A valve pressure plate (55) is held in place by a machine screw (56) to a valve guide rail and pressed upward by a pressure spring (57). Valve pressure plate (55) applies the pressure required to seal material valve (50) as shown in FIG. 9 material valve assembly. A vane shaft assembly, as shown in FIG. 7, is held in place in material hopper (31) by pillow block bearings (90) at each end of vane shaft (30). Vane shaft (30) is driven from the end opposite to the one shown in FIG. 16.

I claim:

1. A self-propelled earth working machine for inserting particulate solid material into existing turf and aerating said turf which comprises a frame structure, a propulsion means, cutter blades driven by said propulsion means for cutting slits in and aerating said turf, a material feed hopper and a material valve mounted on said frame, a vane shaft rotatable about a horizontal axis disposed in said hopper, vanes mounted on said vane shaft, delivery tubes connected to said material valve vertically beneath said vanes so as to receive said solid material dispensed from said hopper through hopper bin outlet ports, said delivery tubes connected to material insertion tubes, wherein the upper end of said material insertion tube is open and the lower end is pinched closed to a planar configuration, said insertion tube, having a leading edge and a trailing edge relative to the direction of machine travel, an outlet for said solid material provided in the trailing edge of said tube and an internal ramp means to direct said solid material out said trailing edge outlet, a measurement wheel pressing on said turf and frictionally driven by said turf when machine is in motion, a drive means connected to said measurement wheel and said vane shaft whereby said vane shaft and said vanes are rotated as said wheel is rotated whereby said particulate solid is supplied through said insertion tubes into said slits at a rate determined by the setting of said material valve for each rotation of said measurement wheel when said machine is in motion.

2. A machine as claimed in claim 1 wherein said material insertion tubes are mounted on a swing arm and tilt arm gimbal means allowing motion in the vertical and side to side directions of said material insertion tubes so as to follow the bottom of said cut slits in said turf independent of machine tip and tilt motion.

3. A machine claimed as in claim 1 wherein said vanes are made from a flat blank having twisted blades so as to provide three types of vanes; one type providing a screw right configuration so as to move material in said hopper from the center of said hopper toward the right end of said hopper, one type providing a screw left configuration so as to move material in said material hopper toward the left end of said hopper, one type having the blades twisted alternately left and right providing a wave or side to side sweeping configuration for use over each outlet of said material hopper bin so as to provide an even flow of material through said material valve for each rotation of said vanes.

4. A machine as claimed in claim 1 wherein said cutter blades have a curved cutting edge which is sharpened and a tapered tip at the end of the blade, said blades being more narrow toward the tip.

5. A machine as claimed in claim 1 wherein said material valve comprises: a multi-part material feed control slide valve mounted under said hopper so that each hopper bin outlet port coincides with a material valve slide port and a delivery tube when said valve is fully open, and each said valve slide port does not coincide with each said hopper bin outlet port when said valve is completely closed, said slide valve being pressed against said hopper bin bottom by a spring pressure means so as to seal said slide valve, said slide valve being connected to a valve control handle by a slide valve link means, such that movement of said handle causes said slide valve to open or close said valve ports, thereby controlling the amount of material delivered or providing a shutoff for the material delivered to said material insertion tubes and into the bottom of said slits in said turf with each rotation of said vanes.

6. A machine as claimed in claim 1 with a depth of cut control mechanism consisting of a measurement wheel arm, said measurement wheel rotably mounted on one end of said measurement wheel arm, the other end of said measurement wheel arm being pivotably mounted on said frame, said measurement wheel arm held in position by a depth control arm pivotally connected to said measurement wheel arm, the other end of said depth control arm being connected to said frame by a depth control pin of selectable positions and a latch means providing a quick change mechanism for depth of cut adjustment.

7. A device for inserting particulate solid material into existing turf and aerating said turf, to be mounted on a self propelled earth working machine as a power source, said device comprises a frame structure, a propulsion means, cutter blades driven by said propulsion means for cutting slits in and aerating said turf, a material feed hopper and a material valve, mounted on said frame, a vane shaft rotatable about a horizontal axis disposed in said hopper, vanes mounted on said vane shaft, delivery tubes connected to said material valve vertically beneath said vanes so as to receive said solid material dispensed from said hopper through hopper bin outlet ports, said delivery tubes connected to material insertion tubes, wherein the upper end of said material insertion tube is open and the lower end is pinched closed to a planar configuration, said insertion tubes having a leading edge and a trailing edge relative to the direction of machine travel, an outlet for said solid material provided in the trailing edge of said tube, with an internal ramp means to direct said solid material out said trailing edge outlet, a measurement wheel pressing on said turf and frictionally driven by said turf when machine is in motion, a drive means connected to said measurement wheel and said vane shaft whereby said vane shaft and said vanes are rotated as said wheel is rotated whereby said particulate solid is supplied through said insertion tubes into said slits at a rate determined by the setting of said material valve for each rotation of said measurement wheel when said machine is in motion.

8. A device as claimed in claim 7 wherein said material insertion tubes have a cylindrical upper section where said material delivery tubes slidably enter allowing said material insertion tubes to rise and fall without being disconnected from said material delivery tubes, said material insertion tubes are mounted to a swing and tilt gimbal means so as to follow the bottom of said cut slits independent of machine vertical and side to side motion.

9. A machine claimed as in claim 7 wherein said vanes are made from a flat blank having twisted blades so as to provide three types of vanes; one type providing a screw right configuration so as to move material in said hopper from the center of said hopper toward the right end of said hopper, one type providing a screw left configuration so as to move material in said material hopper toward the left end of said hopper, one type having the blades twisted alternately left and right providing a wave or side to side sweeping configuration for use over each outlet of said material hopper bin so as to provide an even flow of material through said material valve for each rotation of said vanes.

10. A device as claimed in claim 7 wherein said cutter blades have a curved cutting edge which is sharpened and a tapered tip at the end of the blade, said blades being more narrow toward the tip.

11. A device as claimed in claim 7 wherein said material valve comprises: a multi-part material feed control slide valve mounted under said hopper so that each hopper bin outlet port coincides with a material valve slide port and a delivery tube when said valve is fully open, and each said valve slide port does not coincide with each said hopper bin outlet port when said valve is completely closed, said slide valve being pressed against said hopper bin bottom by a spring pressure means so as to seal said slide valve, said slide valve being connected to a valve control handle by a slide valve link means, such that movement of said handle causes said slide valve to open or close said valve ports, thereby controlling the amount of material delivered or providing a shutoff for the material delivered to said material insertion tubes and into the bottom of said slits in said turf with each rotation of said vanes.

12. A device as claimed in claim 7 with a depth of cut control mechanism consisting of a measurement wheel arm, said measurement wheel rotably mounted on one end of said measurement wheel arm, the other end of said measurement wheel arm being pivotably mounted on said frame, said measurement wheel arm held in position by a depth control arm pivotably connected to said measurement wheel arm, the other end of said depth control arm being connected to said frame by a depth control pin of selectable positions and a latch means providing a quick change mechanism for depth of cut adjustment.

* * * * *